(12) United States Patent
Jung et al.

(10) Patent No.: US 7,729,705 B2
(45) Date of Patent: Jun. 1, 2010

(54) METHOD OF PROVIDING LOCATION SERVICE OVER IMS NETWORK

(75) Inventors: Heung-Chul Jung, Suwon-si (KR); Hye-Won Baek, Sungnam-si (KR)

(73) Assignee: Samsung Electronics Co., Ltd. (KR)

( * ) Notice: Subject to any disclaimer, the term of this patent is extended or adjusted under 35 U.S.C. 154(b) by 1076 days.

(21) Appl. No.: 11/409,331

(22) Filed: Apr. 21, 2006

(65) Prior Publication Data

US 2006/0242307 A1   Oct. 26, 2006

(30) Foreign Application Priority Data

Apr. 21, 2005   (KR) ................... 10-2005-0032964

(51) Int. Cl.
*H04W 24/00* (2009.01)
(52) U.S. Cl. .............. 455/456.1; 455/456.2; 455/456.3; 455/456.5; 455/404.2
(58) Field of Classification Search .............. 455/456.1, 455/456.2, 456.3, 456.5, 404.2, 552.1
See application file for complete search history.

(56) References Cited

U.S. PATENT DOCUMENTS

| 7,016,693 | B2 * | 3/2006 | Guyot ...................... 455/456.2 |
| 7,054,615 | B2 * | 5/2006 | Evensen et al. ............. 455/411 |
| 7,242,946 | B2 * | 7/2007 | Kokkonen et al. ........ 455/456.1 |
| 7,421,277 | B2 * | 9/2008 | Burroughs ................ 455/456.2 |

FOREIGN PATENT DOCUMENTS

| KR | 1020030000530 | 1/2003 |
| KR | 1020030052841 | 6/2003 |
| WO | WO 2004/064418 | 7/2004 |
| WO | WO 2004/080096 | 9/2004 |

* cited by examiner

*Primary Examiner*—Temica M Beamer
(74) *Attorney, Agent, or Firm*—The Farrel Law Firm, LLP

(57) ABSTRACT

A method of providing Location Services (LCS) over an Internet Protocol Multimedia Subsystem (IMS) network in a wireless communication system is provided. An LCS client transmits a service connection request message including a message requesting the location information of a User Equipment (UE). The UE transmits the location information to the LCS client.

10 Claims, 4 Drawing Sheets

METHOD OF PROVIDING LOCATION SERVICE OVER IMS NETWORK

PRIORITY

This application claims priority under 35 U.S.C. §119 to an application entitled "Method For Providing Location Service On IMS Based Network" filed in the Korean Intellectual Property Office on Apr. 21, 2005 and assigned Serial No. 2005-32964, the contents of which are herein incorporated by reference.

BACKGROUND OF THE INVENTION

1. Field of the Invention

The present invention relates generally to a method of providing Location Services (LCS) in an IP (Internet Protocol) Multimedia Subsystem (IMS)-based network environment, and in particular, to a method of providing LCS over an IMS network in a broadband wireless network.

2. Description of the Related Art

One of the reasons that an IMS network attracts great interest is that an IMS-based IP core network system provides a vision of the full convergence of wired and wireless services including future-generation mobile communications, Wireless Local Area Network (WLAN), and cable, as well as wired broadband Internet.

LCS is an application system and a service provisioning technology that accurately locates a person or an object over a mobile communication network and utilizes the accurate location. A $3^{rd}$ Generation Partnership Project (3GPP) Technical Specification (TS) 22.071 notes "Location Services may be considered as a network provided enabling technology consisting of standardized service capabilities which enable the provisioning of location based applications".

The implementation of LCS requires advanced positioning, positioning accuracy development, position processing in wireless Internet, spatial data processing, LCS platform-related technology, LCS application software development, an open geographic information system, LCS-related standardization, and LCS application service development. These technologies enable service providers to provide a variety of associated services such as information about surroundings, location tracking, safety, traffic information, delivery and navigation, and location advertisement.

FIG. 1 is a diagram illustrating a signal flow of an operation for providing LCS over a typical 3GPP network. Communications are conducted by Open Mobile Alliance (OMA) Mobile Location Protocol (MLP) between an LCS client and a Gateway Mobile Location Center (GMLC) (steps 131 and 153) and between GMLCs (steps 144 and 148). Communications between the GMLC and a Subscription Locator Function (SLF) and between the GMLC and a Home Location Register (HLR)/Home Subscriber System (HSS) (steps 134 to 139) are made via an IMS interface, Dh (interface between Requesting Location IMS-Interworking Function (LIMS-IWF) and SLF) or Sh (interface between LIMS-IWF and HSS/HLR), or by Media Access Protocol (MAP). The GMLC is interfaced with a 3G network element such as a Serving General Packet Radio Service (GPRS) Support Node (SGSN) by MAP (steps 145 and 147).

Referring to FIG. 1, when an LCS client 100 wants to locate a target User Equipment (UE) 120, he transmits an LCS Service Request message to a home LIMS-IWF 106 via a requesting GMLC 102 and a requesting LIMS-IWF 104 in steps 131, 132 and 133.

The requesting GMLC 102 manages an external interface to provide LCS. For example, it is responsible for authentication of an external LCS client, mobility management, determination of the position accuracy of final position estimation for retry and reject, and coordinates transformation for identification of the LCS client. The LIMS-IWF, located within the GMLC, is an interworking function for supporting LCS based on IMS. To obtain the location information of a UE using an IMS Public User Identity (i.e. Session Initiation Protocol-Uniform Resource Identifier (SIP-URI)) in an existing packet-switched network, the LIMS-IWF acquires the Mobile Subscriber ISDN (MSISDN) of the UE.

The LCS Service Request message is defined with MLP. It carries the ID of the target UE be located (SIP-URI in the IMS network), an LCS type (Immediate or Conditional), LCS requirements, the ID of the UE requesting the location information, and authentication information.

The home LIMS-IWF 106 gets the address of an HLR/HSS 110 to which the UE 120 has been registered by querying an SLF 108 via a Dh interface (Dh-SLF) in steps 134 and 135. When two or more HSSs/HLRs reside within the network and they are identified by different addresses, the SLF 108 provides the address of the HSS/HLR 110 to which the UE 120 has been registered.

The home LIMS-IWF 106 then retrieves the MSISDN of the target UE 120 having an SIP-URI from the HSS/HLR 110 via an Sh interface (Sh-PULL) in steps 136 and 137.

The HSS/HLR 110 manages LCS subscription information and location information for terminated routing, to thereby track access. It also provides user profile information directly or via a server and performs authentication.

In steps 138 and 139, the home LIMS-IWF 106 retrieves the network ID of a home GMLC 112 using a MAP message with the MSISDN of the UE 120. The home LIMS-IWF 106 forwards the LCS Service Request message to the home GMLC 112 according to the network ID in step 140.

In step 141, the home GMLC 112 performs a privacy check to determine whether the LCS client 100 is allowed to locate the UE 120. If the privacy check passes, i.e. permission is granted to locate the UE 120, the home GMLC 112 queries the HSS/HLR 110 using a Send Routing Info for LCS message being a MAP message with the MSISDN of the UE 120 to get the address of a visited GMLC 114 in step 142. The HSS/HLR 110 transmits the network ID of the visited GMLC 114 to the home GMLC 112 by a Send Routing Info for LCS Ack message being a MAP message in step 143.

The home GMLC 112 forwards the LCS Service Request message to the visited GMLC 114 according to its network ID in step 144. In step 145, the visited GMLC 114 translates the LCS Service Request message to a Location Request message in the form of a Radio Resource LCS Protocol (RRLP) message and transmits the Location Request message to an SGSN 116. The SGSN 116 contains functionality responsible for management of LCS routing information and authentication of LCS subscribers. The SGSN 116 forwards the Location Request message to the UE 120 via a Base Station System (BSS) 118 and measures the location of the UE 120 in step 146.

After the location measurement, the SGSN 116 notifies the LCS client 100 of the location of the UE 120 by an LCS Service Response message in steps 147 to 153. During the transmission of the location information of the UE 120, the home GMLC 112 performs a privacy check to determine whether the LCS client 100 is allowed to locate the UE 120 in step 149. Only when the privacy check passes, the subsequent steps are carried out.

FIG. 2 is a diagram illustrating a signal flow of an operation for providing a conditional LCS over the typical 3GPP network. The conditional LCS is a location service contingent on some current or future event specified by an LCS client. Only when the event occurs, the location information of a target LE is provided to the LCS client.

Referring to FIG. 2, when an LCS client 200 wants to locate a target LE 214, he transmits an LCS Service Request message to a requesting GMLC 202 in step 221. The LCS Service Request message is defined with MLP. It carries the ID of the target UE (SIP-URI), an LCS type (Immediate or Conditional), LCS requirements, the ID of the UE requesting the location information, and authentication information. The SIP-URI is an IMS public user ID.

In step 222, the requesting GMLC 202 forwards the LCS Service Request message to a visited GMLC 208 via a home GMLC 204 and an HLR/HSS 206 in the same manner as in steps 134 to 144 of FIG. 1.

The visited GMLC 208 requests the location information of the UE 214 to a Mobile Switching Center (MSC)/SGSN 210 by a Provide Subscriber Location message being a MAP message in step 223. The MSC/SGSN 210 contains functionality responsible for management of LCS routing information, and control of authentication of LCS subscribers and LCS provisioning.

The MSC/SGSN 210 locates the LE 214 via a Random Access Network 212 and performs operations needed to communicate with the UE 214, including authentication, in step 224. If a connection is established to the LE 214, the MSC/SGSN 210 transmits an LCS Area Event Invoke message to the UE 214 to indicate that an LCS area event has been set in step 225. In steps 226 to 230, the UE 214 transmits an LCS Service Response message to the LCS client 200, notifying of an acknowledgement for the invoked LCS area event. For example, the LCS area event to be reported is the LE 214 being in an area set by the LCS client 200 (e.g. Cupertino in Santa Clara County).

If the area event occurs, for example, the UE 214 enters Cupertino in Santa Clara County in step 231, the UE 214 transmits its location information to the LCS client 200 by an LCS Service Response message in steps 232 to 238. If the UE 214 moves and thus a network element managing the location information of the UE 214 is changed, the home GMLC 204 retransmits the LCS Service Request message to the changed network element to which the UE 214 is now registered in step 235. During the transmission of the location information of the UE 214, the home GMLC 204 performs a privacy check to determine whether the LCS client 200 is allowed to locate the UE 214 in step 236. Only when the privacy check passes, the subsequent steps are carried out.

As described above, the MLC and the 3G network communicate with each other via the MAP interface to provide LCS. However, implementation of the MAP interface for LCS is inefficient to a network that provides an IP multimedia service independently of a bearer network.

Moreover, when the UE roams and the network element managing its location information is changed in the conditional LCS, the GMLC inconveniently has to retransmit the LCS Service Request message to the new network element.

SUMMARY OF THE INVENTION

An object of the present invention is to substantially solve at least the above problems and/or disadvantages and to provide at least the advantages below. Accordingly, an object of the present invention is to provide a method of providing LCS over an IMS network in a wireless communication system.

Another object of the present invention is to provide a method of providing a conditional LCS over an IMS network in a wireless communication system. A further object of the present invention is to provide a method of transmitting a location service request message in the form of an IMS-based SIP message in a wireless communication system. The above objects are achieved by providing a method of providing LCS over an IMS network in a wireless communication system.

According to one aspect of the present invention, in a method of providing a location service over an IMS network in a wireless communication system, a location service client transmits a service connection request message including a message requesting the location information of a UE. The UE transmits the location information to the location service client.

According to another aspect of the present invention, in a method of providing a conditional location service over an IMS network in a broadband wireless communication system, a location service client transmits a service connection request message including a message requesting the location information of a UE. The UE checks a condition that triggers transmission of the location information in the service connection request message and transmits a response message indicating reception of the service connection request message to the location service client. If the condition is fulfilled, the UE transmits the location information to the location service client by the UE.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a method of providing LCS over an IMS network.

In the present invention as described below, an Extensible Markup Language (XML)-based MLP message carrying LCS information between an LCS client and a server is included in an Session Description Protocol (SDP) area of an SIP message, for transmission to a UE, by way of example. Since the use of SIP messages obviates the need for an additional server to interpret MLP messages between the LCS client and a UE, only Proxy (P)/Serving (S)/Interrogating (I)-Call Session Control Functions (CSCFs) are involved in the message transmission/reception.

Figure 1:
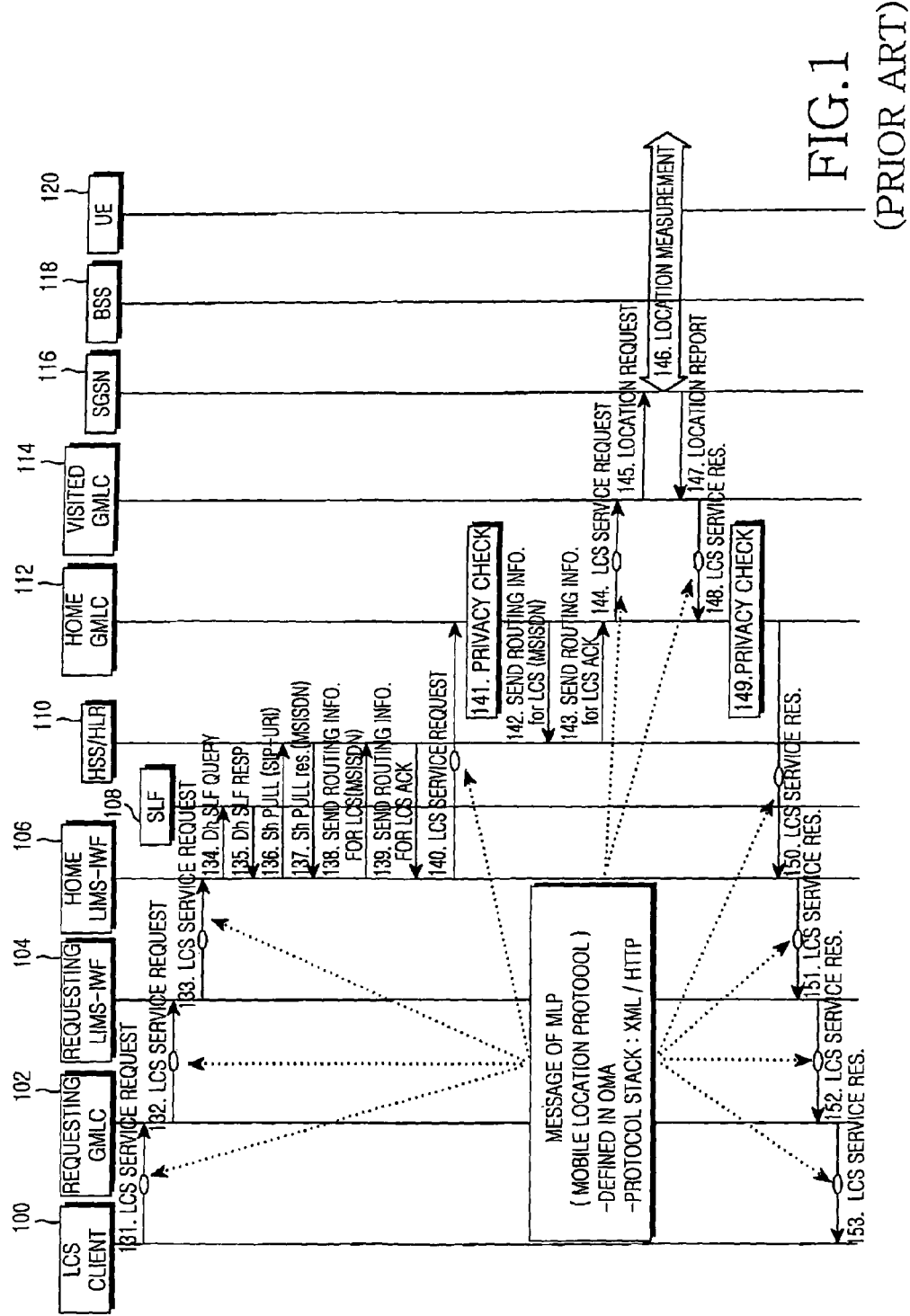
FIG. 1 is a diagram illustrating a signal flow for an operation for providing LCS over a typical 3GPP network.
Figure 2:
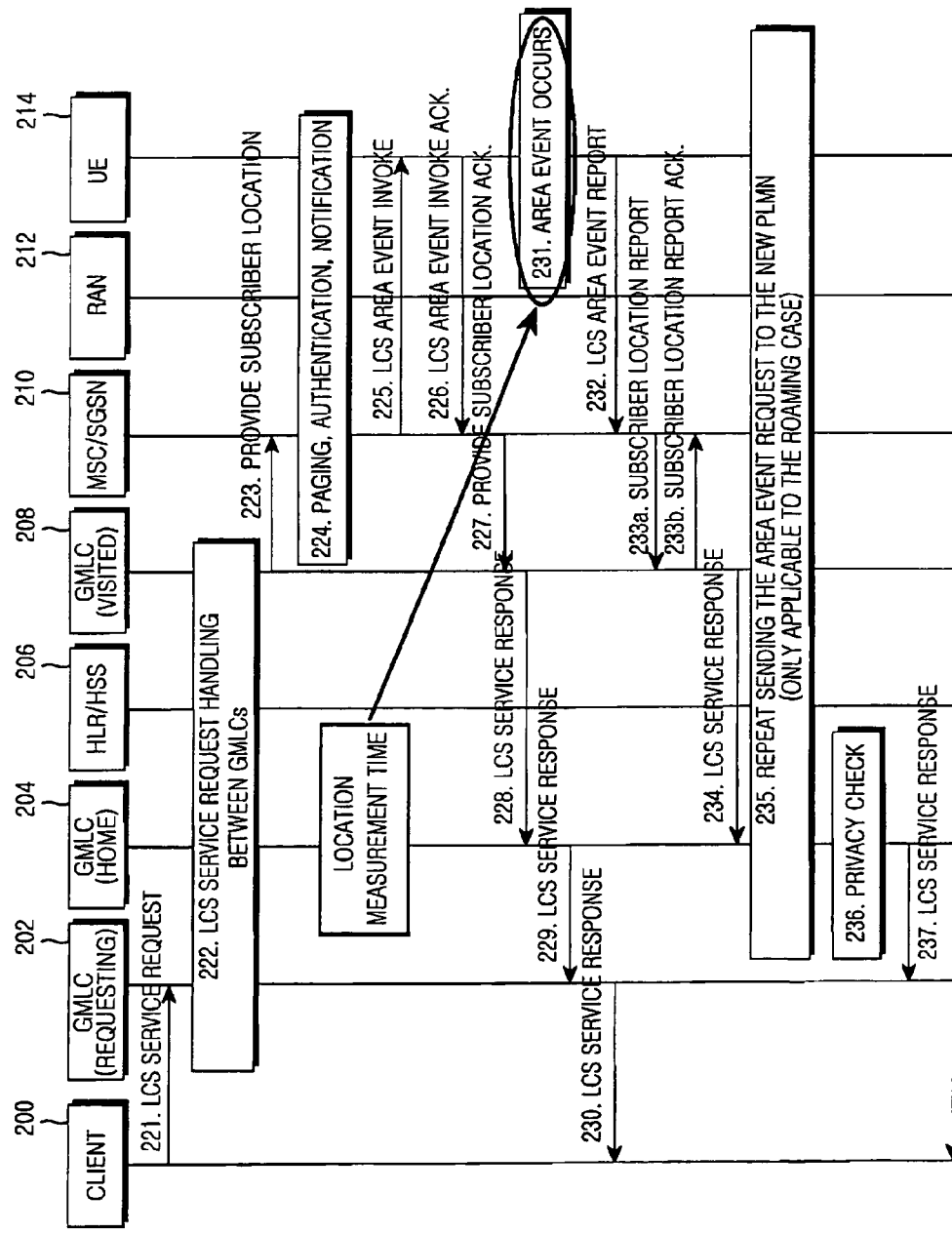
FIG. 2 is a diagram illustrating a signal flow for an operation for providing conditional LCS over the typical 3GPP network.
Figure 3:
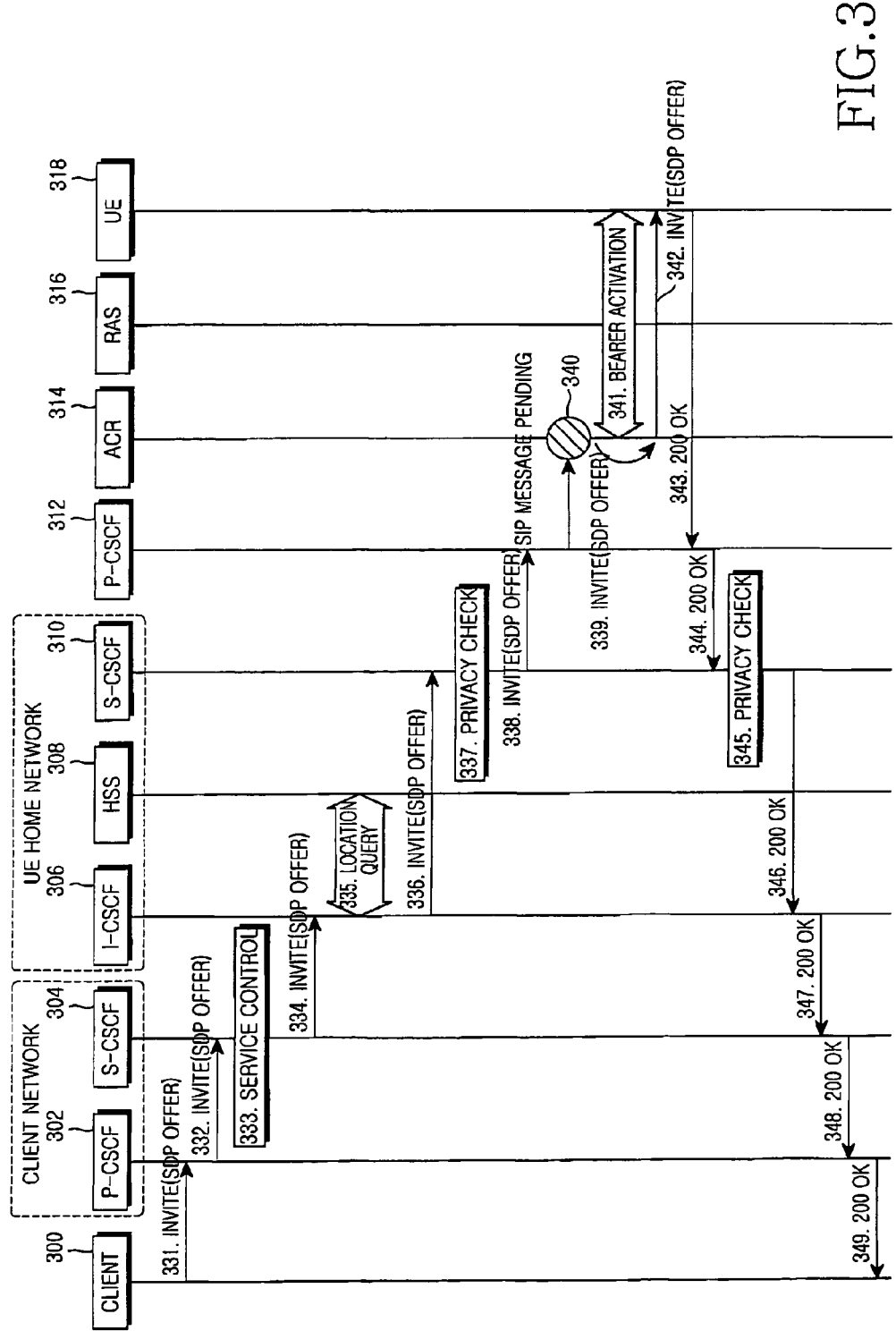
FIG. 3 is a diagram illustrating a signal flow of an operation for providing LCS over an IMS network according to an embodiment of the present invention.

FIG. 3 is a diagram illustrating a signal flow of an operation for providing LCS over an IMS network according to the present invention.

Referring to FIG. 3, when an LCS client 300 wants to locate a target UE 318, it transmits an INVITE (SDP offer) message to a P-CSCF 302, requesting the location information of the UE 318 in step 331. The P-CSCF 302 has stored the address of an S-CSCF 304 in advance. In the presence of a SIP message destined for the S-CSCF 304, the P-CSCF 302 transmits it to the S-CSCF 304. The INVITE message is an SIP message including an MLP message in an SDP area.

The P-CSCF 302 forwards the INVITE message to the S-CSCF 304 in step 332. The S-CSCF 304 performs service profile validation and necessary service control in step 333 and forwards the INVITE message to an I-CSCF 306 in step 334.

The I-CSCF 306 serves as a contact point for every incoming call for subscribers within the network and a contact point into the network for other network subscribers. Thus, the I-CSCF 306 functions as a firewall and hides the configuration, topology and capacity of the provider network from the outside. In accordance with the present invention, the I-CSCF 306 queries an HSS 308 to detect an S-CSCF to receive the INVITE message, i.e. an S-CSCF 310 to which the UE 318 has been registered in step 335. The HSS 308 tracks access by managing the location information of UEs. It also provides user profiles directly or via a server.

In step 336, the I-CSCF 306 forwards the INVITE message to the S-CSCF 310. In step 337, the S-CSCF 310 determines whether to proceed by checking the privacy class of the UE 318 (e.g. LCS availability, privacy strictness, and classes of LCS clients for which location is allowed) in a subscriber profile received from the HSS 308.

If the LCS client 300 is allowed to locate the UE 318 according to the privacy class of the UE 318, the S-CSCF 310 forwards the INVITE message to an Access Control Router (ACR) 314 via a P-CSCF 312 in steps 338 and 339. The ACR 314 leaves the INVITE message pending while establishing a connection with the UE 318 in step 340.

The ACR 314 performs operations regarding communications with the UE 318 via a Radio Access Station (RAS) 316, including location and authentication in step 341. If the ACR 314 is connected to the UE 318, it forwards the INVITE message to the UE 318 in step 342. If the UE 318 is in an idle mode, the ACR 314 activates the UE 318, prior to the forwarding.

In steps 343 to 349, the UE 318 transmits its location information to the LCS client 300 by a 200 OK message. In the process of transmission of the 200 OK message, the S-CSCF 310 checks the privacy class of the UE 318 (e.g. LCS availability, privacy strictness, and classes of LCS clients for which location is allowed) in step 345. Only when the privacy class of the UE 318 allows the LCS client 300 to locate the UE 318, does the S-CSCF 310 performs the next step.

Figure 4:
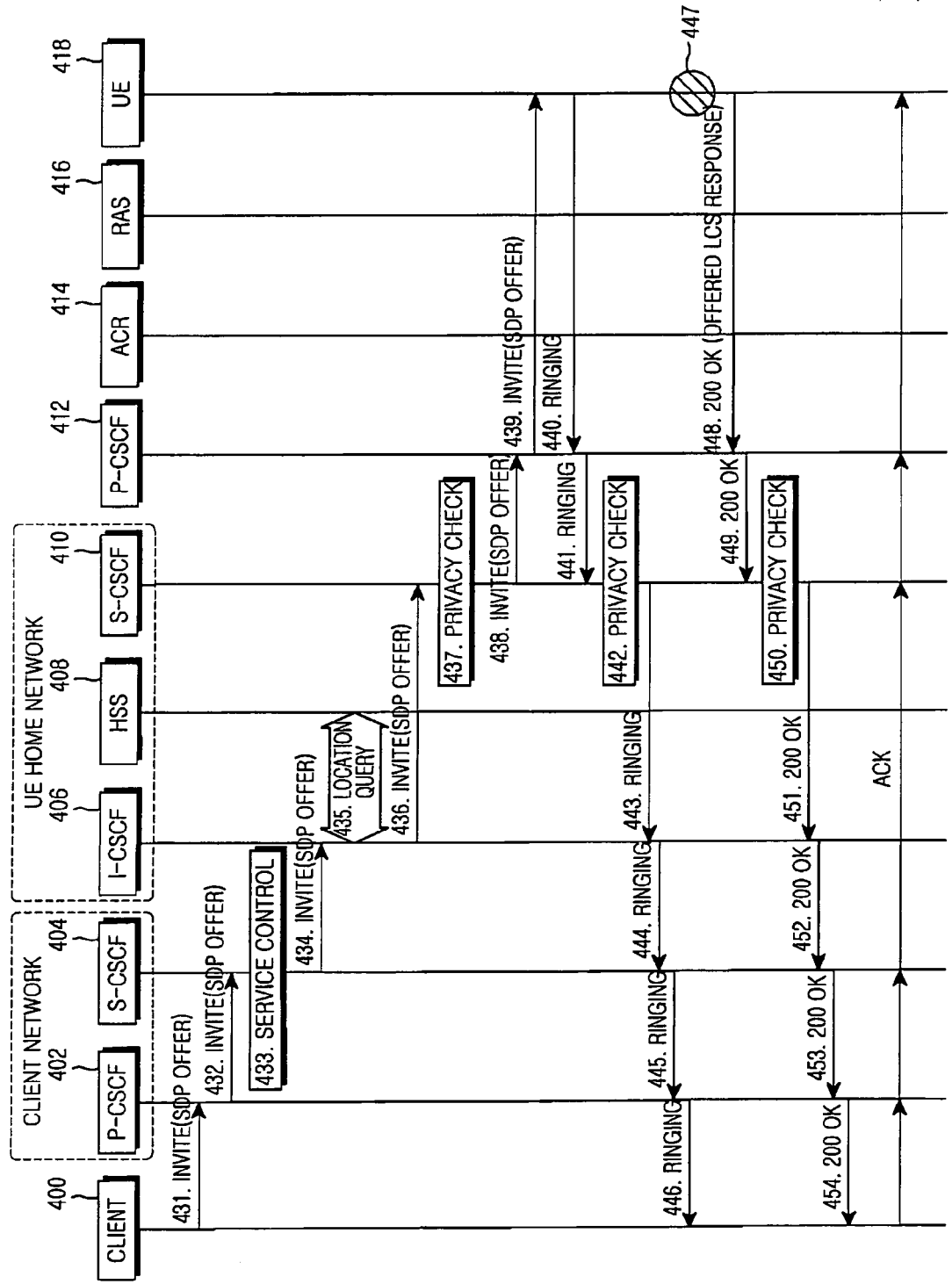
FIG. 4 is a diagram illustrating a signal flow of an operation for providing conditional LCS over the IMS network according to an embodiment of the present invention.

FIG. 4 is a diagram illustrating a signal flow of an operation for providing a conditional LCS over the IMS network according to another embodiment of the present invention.

Referring to FIG. 4, when an LCS client 400 wants to locate a target UE 418, it transmits an INVITE (SDP offer) message to a P-CSCF 412 via a P-CSCF 402, an S-CSCF 404, an I-CSCF 406, an HSS 408, and an S-CSCF 410 in steps 431 to 438 in the same manner as in steps 331 to 338 of FIG. 3. The INVITE message is an SIP message including an MLP message in an SDP area. It also indicates an event that triggers locating the UE 418, as set by the LCS client 400. For instance, the event may be the UE 418 being in an area set by the LCS client 400 (e.g. Cupertino in Santa Clara County).

As in step 341 of FIG. 3, the P-CSCF 412 forwards the INVITE message to the UE 418 via an ACR 414 and an RAS 416 by establishing a connection to the UE 418 in step 439. The UE 418 replies to the LCS client 400 with a Ringing message in steps 440 to 446. During the transmission of the Ringing message, the S-CSCF 410, which has received the location information of the UE 418, checks the privacy class of the UE 418 (e.g. LCS availability, privacy strictness, and classes of LCS clients for which location is allowed) in step 441. Only when the privacy class of the UE 418 allows the LCS client 400 to locate the UE 418, the S-CSCF 410 performs the next step.

When the event occurs, for example, the UE 418 enters Cupertino in Santa Clara County in step 447, the UE 418 transmits its current location information to the LCS client 400 by a 200 OK message in steps 448 to 454. During the transmission of the 200 OK message, the S-CSCF 410, which has received the location information of the UE 418, checks the privacy class of the UE 418 (e.g. LCS availability, privacy strictness, and classes of LCS clients for which location is allowed) in step 450. Only when the privacy class of the UE 418 allows the LCS client 400 to locate the UE 418, the S-CSCF 410 performs the next step.

As described above, LCS provisioning using SIP over an IMS network in a wireless communication system obviates the need for MAP interfaces and associated messages for interworking with 3G network elements in the conventional LCS. Therefore, LCS can be provided between wireless networks ensuring mobility.

Regarding conditional LCS in a case where an access network is changed, while location information cannot be transmitted until the network information of a new attach point (e.g. SGSN/MSC) is acquired in the conventional technology, the location information is transmitted using a known IP address of a P-CSCF in the present invention, thereby simplifying an LCS providing process.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of providing a location service over an Internet protocol (IP) multimedia subsystem (IMS) network in a wireless communication system, the method comprising the steps of:

transmitting, by a location service client, a service connection request message including a message requesting location information of a user equipment (UE); and transmitting, by the UE, the location information to the location service client, wherein the location service client transmits the service connection request message as a Session Initiation Protocol (SIP) message to a Proxy Call Session Control Function (P-CSCF) requesting the location information of the UE stored in advance by the P-CSCF as an address of a Serving Call Session Control Function (S-CSCF), wherein the SIP message includes a mobile location protocol (MLP) message in a session description protocol (SDP) area, and wherein transmitting the SIP message to the UE comprises, upon receipt of the SIP message, checking a privacy class of the UE and transmitting the SIP message to the UE by the S-CSCF, only when the privacy class allows.

2. The method of claim 1, wherein the privacy class specifies LCS availability, privacy strictness, and classes of location service clients for which location information is allowed.

3. The method of claim 1, further comprising the step of, upon receipt of the location information of the UE destined for the location service client, checking the privacy class of the UE and transmitting the location information to the location service client by the S-CSCF, only when the privacy class allows.

4. The method of claim 3, wherein the privacy class specifies LCS availability, privacy Strictness, and classes of location service clients for which location information is allowed.

5. A method of providing a conditional location service over an Internet protocol (IP) multimedia subsystem (IMS) network in a broadband wireless communication system, the method comprising the steps of:
    transmitting, by a location service client, a service connection request message including a message requesting location information of a user equipment (UE);
    checking a condition that triggers transmission of the location information in the service connection request message and transmitting by the UE a response message indicating reception of the service connection request message to the location service client; and
    transmitting, by the UE, the location information to the location service client, if the condition is fulfilled,
    wherein the location service client transmits the service connection request message as a Session Initiation Protocol (SIP) message to a Proxy Call Session Control Function (P-CSCF) requesting the location information of the UE stored in advance by the P-CSCF as an address of a Serving Call Session Control Function (S-CSCF),
    wherein transmitting the SIP message to the UE comprises, upon receipt of the SIP message, checking a privacy class of the UE and transmitting the SIP message to the UE by the S-CSCF, only when the privacy class allows.

6. The method of claim 5, wherein the privacy class specifies LCS availability, privacy strictness, and classes of location service clients for which location information is allowed.

7. The method of claim 5, further comprising the step of, upon receipt of the location information of the UE destined for the location service client, checking the privacy class of the UE and transmitting the location information to the location service client by the S-CSCF, only when the privacy class allows.

8. The method of claim 7, wherein the privacy class specifics LCS availability, privacy strictness, and classes of location service clients for which location information is allowed.

9. A method of providing a location service in a wireless communication system, the method comprising the steps of:
    transmitting by a location service client a service connection request message including a message requesting a user equipment location information; and
    transmitting the location information to the location service client by the user equipment (UE),
    wherein the location service client transmits the service connection request message as a Initiation Protocol (SIP) message to a Proxy Call Session Control Function (P-CSCF) requesting the location information of the UE stored in advance by the P-CSCF as an address of a Serving Call Session Control Function (S-CSCF),
    wherein the SIP message includes a mobile location protocol (MLP) message in a session description protocol (SDP) area, and
    wherein transmitting the SIP message to the UE comprises, upon receipt of the SIP message, checking a privacy class of the UE and transmitting the SIP message to the UE by the S-CSCF, only when the privacy class allows.

10. A method of providing a conditional location service in a wireless communication system, the method comprising the steps of:
    transmitting by a location service client a service connection request message including a message requesting user equipment location information;
    checking a condition that triggers transmission of the user equipment location information in the service connection request message and transmitting by the user equipment (UE) a response message indicating reception of the service connection request message to the location service client; and
    transmitting by the user equipment the location information to the location service client,
    wherein the location service client transmits the service connection request message as a Session Initiation Protocol (SIP) message to a Proxy Call Session Control Function (P-CSCF) requesting the location information of the UE stored in advance by the P-CSCF as an address of a Serving Call Session Control Function (S-CSCF),
    wherein the SIP message includes a mobile location protocol (MLP) message in a session description protocol (SDP) area, and
    wherein transmitting the SIP message to the UE comprises, upon receipt of the SIP message, checking a privacy class of the UE and transmitting the SIP message to the UE by the S-CSCF, only when the privacy class allows.

* * * * *